UNITED STATES PATENT OFFICE.

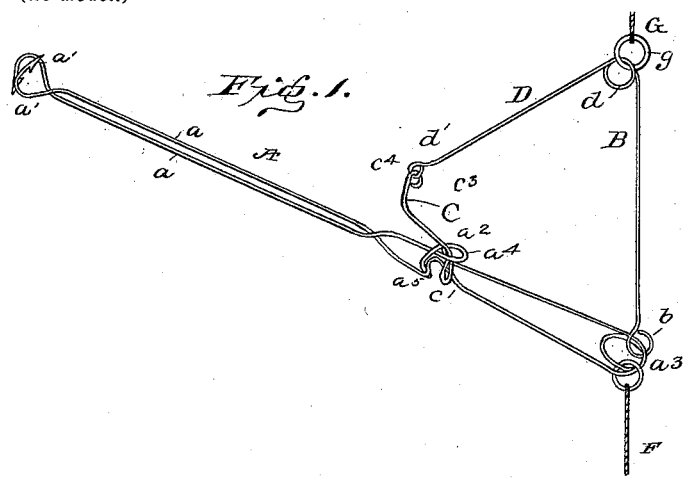
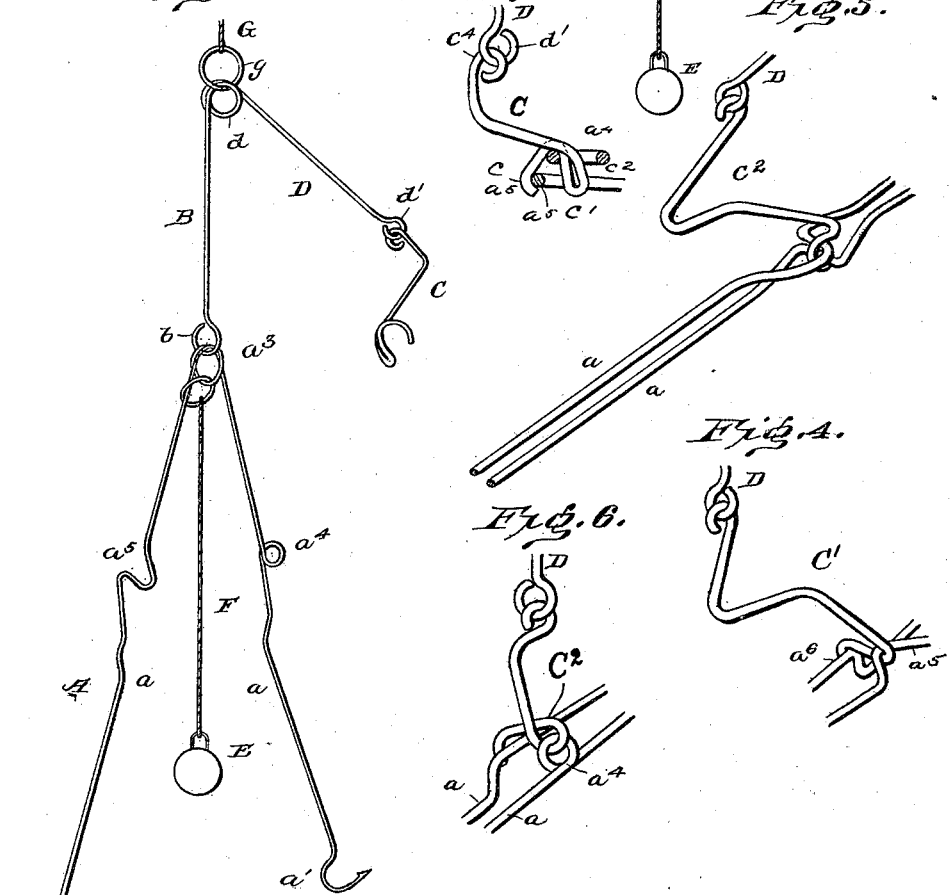

DAVID WILEY ANDERSON, OF RICHMOND, VIRGINIA, ASSIGNOR OF ONE-HALF TO JULIAN T. WRIGHT, OF SAME PLACE.

FISH-HOOK OR ANIMAL-TRAP.

SPECIFICATION forming part of Letters Patent No. 644,960, dated March 6, 1900.

Application filed September 13, 1899. Serial No. 730,385. (No model.)

*To all whom it may concern:*

Be it known that I, DAVID WILEY ANDERSON, a citizen of the United States, residing at Richmond, in the county of Henrico and State of Virginia, have invented certain new and useful Improvements in Fish-Hooks or Animal-Traps, of which the following is a specification, reference being had therein to the accompanying drawings.

Figure 1 is a perspective view showing a form of hook for a fish or animal embodying my improvements, showing the apparatus in set position. Fig. 2 is a perspective view showing the parts in the positions occupied when they have been released from the spring action. Fig. 3 is a section across the hook-rods and showing in side view the trigger device. Fig. 4 is a perspective view of a modified form of hook. Fig. 5 is a cross-section showing the relation of the trigger-arm to the other parts. Fig. 6 is a perspective view of a second modified form.

Referring to Fig. 1, A indicates the hook part proper as a whole. B is the hook-carrier; C, the trigger; D, the trigger-pulling device; E, the sinker; F, the sinker-carrier, and G the main cord by which the whole device is suspended. In this construction the hook A is formed of two arms, legs, or bars $a\, a$, each terminated in a pointed hooked bar $a'$. At their inner ends these hook-bars $a'\, a'$ are connected together by means of a spring $a^3$. This spring part can be integral with the hook-arms, and all of them can be formed by simply bending a single piece of wire into the required shape. Normally the legs $a\, a$ are separated or intended to be separated through the action of the spring part $a^3$. At $a^2\, a^2$ the hook arms or bars may be so shaped as to provide a trigger attachment. As shown in Figs. 1 and 2, one of the legs is provided with or bent to form an eye, as at $a^4$, and the opposite leg is preferably bent in the way illustrated to form more or less of an offset $a^5$. The eye-coil or spring part $a^3$ can also be utilized as a means of attaching the hook to its carrier B, the latter being preferably a wire arm having an eye $b$ at its lower end engaging with that at $a$. To this eye or coil $a^3$ can also be attached the carrier F, which supports the sinker E. The main coil G is herein shown as being connected to the carrier B by means of a ring or eye $g$. The trigger-pulling device D is preferably made integral or rigid with the hook-carrier B, they being formed by bending a piece of wire, and at their joining-points a coil $d$ can be formed which can be more or less elastic to increase the quickness of action of the movable parts.

The trigger (indicated as a whole by C) is in the device illustrated in Fig. 1 formed by bending a piece of wire in such way as to have a number of hook-like parts $c\, c'$ near one of its ends and a bend $c^2$ next to the hook $c'$, a relatively-long lever-like arm $c^3$, and an eye or supporting device at $c^4$. The trigger-carrier D is formed with an eye $d'$, which engages with the eye $c^4$, and the trigger when disengaged is free to swing or move freely through the articulation of these eyes. When the hook is to be set, the two hook bars or legs $a\, a'$ are pressed together, bringing the eye $a^4$ and the angular offset $a^5$ in the legs into juxtaposition, and then the trigger is turned, so that the end hook $c$ thereon can be passed partly through the aforesaid eye $a^4$ and the hook $c'$ can be passed down on the opposite side of the other leg $a$ and lie in the offset angle at $a^5$. When so placed, the hooks $c\, c'$ of the figure act to hold the two legs $a\, a$ close together in their "set" position.

It will be seen by examining Fig. 2 that if an upward strain be exerted upon the trigger-arm C it will tend to be moved laterally, and while so moving the hook parts at $c\, c'$ move around one of the legs $a\, a$ as a fulcrum—to wit., the one adjacent to the hook $c'$. This latter movement an instant after commencing results in disengaging the hooks $c$ from the eye $c^4$. As soon as such a disengagement occurs the elasticity of the legs or part which serves as a spring forces the hook ends $a\, a$ suddenly apart.

I have heretofore devised a number of spring-actuated hooks embodying more or less of the features of construction or operation incident to that above described, but the latter differs from the earlier ones in several important respects. The trigger and the arm $c^3$ herein are so situated that the latter can exert the peculiar lateral leverage above referred to for disengaging the trigger from one or both of the hook-legs—that is to say, the trigger and its lever herein have movements relative to one of the hook-legs which are different from those which it has relative to the other, whereas in the earlier constructions the movements of both of the trigger-lugs, respectively, relatively to their adjacent legs were similar.

Substantially the same desirable ends can be reached if there be modification in any of several respects in the forming of the parts. Thus in the form shown in Fig. 4 the closed eye $a^4$ is dispensed with, and in lieu thereof the hook-leg $a$ on that side is formed with an angular offset $a^6$, approximately similar to that at $a^5$ on the other leg, but turned in the opposite direction. In this case the active part of the trigger which engages with the legs is approximately ∽-shaped, one of the legs $a$ lying in one of the bends of the trigger and the other leg lying in the other bend, and when draft is applied to the arm C' the end part of the trigger swings around the inner part as a center until the release is effected.

In Fig. 5 is shown another manner of applying the trigger, in which the latter lies and turns in the general plane of the hook-legs, engaging short transverse portions of the latter.

In Fig. 6 another modification is shown. In this case substantially the same features are retained, which relate to the rocking of the trigger around a point intermediate of its extremities, said point being adjacent to and bearing upon one of the legs $a$; but in this case the trigger part is bent to have or provided with an eye $C^2$, permanently connected with and hinged to the eye $a^4$ in the hook-leg.

It will be seen that when either of the constructions is in use and is suspended in the water or air the hook part proper, the legs $a\,a$, and the hooks $a'\,a'$ will be held substantially horizontally, governed by the upward draft of the main cord G, the downward draft of the sinker E, and the sinker-carrier F and trigger-carrying part D. The hook A as a whole is supported by means independent of the trigger and trigger-operating device, and in this respect the implement differs from those of other parties with which I am acquainted.

What I claim is—

1. A device for catching fish and for similar purposes having the hook part with two oppositely-moving spring-actuated arms and a drawing device connected to that part of the hook opposite to the points, and a trigger for holding the two oppositely-moving spring-arms in set position and adapted to rock relatively about one of the said hook-arms when engaging with or disengaging from the other hook-arm, and means for operating the trigger, substantially as set forth.

2. A device for catching fish, and similar purposes, having a horizontally and laterally extending hook with two oppositely-moving spring-actuated hook-points, means for attaching the same to a line, a trigger adapted to engage the shank of one of said hooks and to turn or twist thereon transversely to the shank, and having means for engaging the shank of the other hook, and a drawing device for disengaging the trigger adapted to connect the latter with the line independently of the connection between the line and hook, substantially as set forth.

3. A device for catching fish, and similar purposes, having a hook with two oppositely-moving spring-actuated hook-points, a trigger pivotally connected or linked with the shank of one of said hooks, having means for engaging the shank of the other hook, and a free arm, and means for connecting said arm with the line independently of the connection between said line and the hook, substantially as set forth.

In testimony whereof I affix my signature in presence of two witnesses.

DAVID WILEY ANDERSON.

Witnesses:
HUGH DENOON,
D. EARLE ALLEN.